Figure 8:
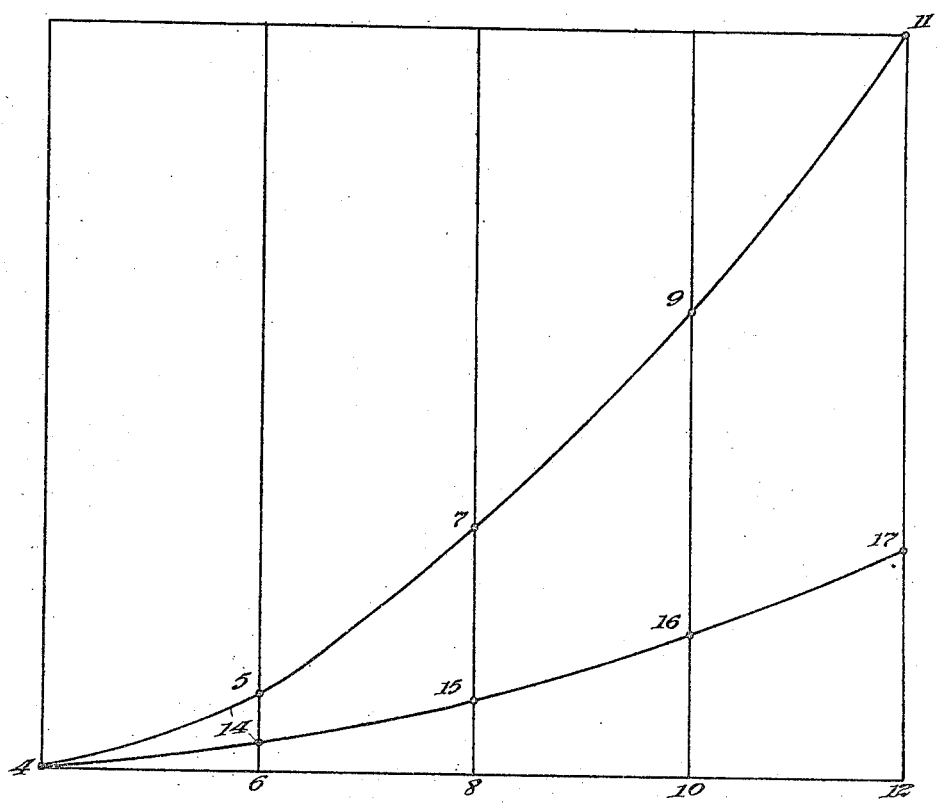

T. A. EDISON.
SOUND RECORD.
APPLICATION FILED JAN. 3, 1907.
964,221.
Patented July 12, 1910.
3 SHEETS—SHEET 1.
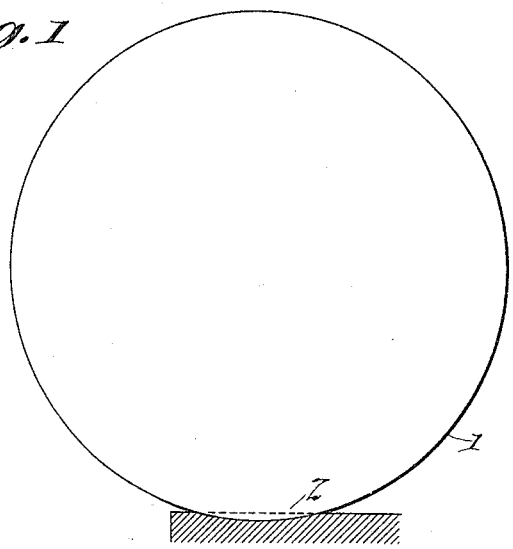
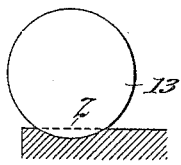
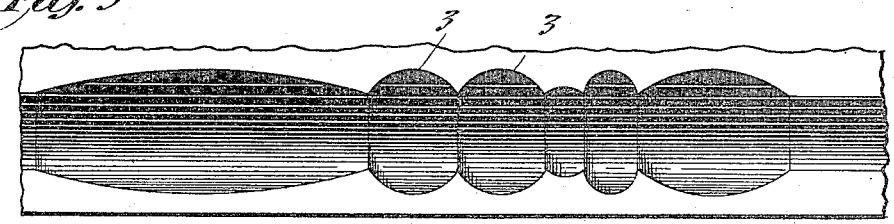
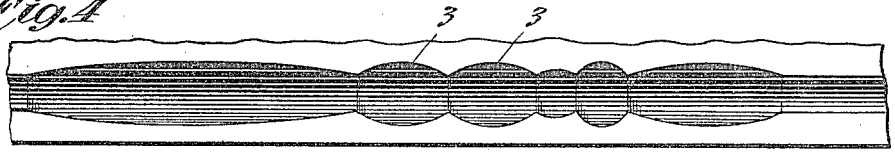
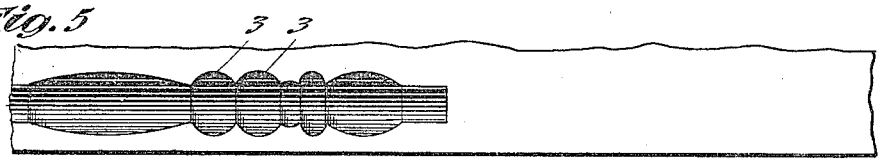
Witnesses:
Frank D. Lewis
Delos Holden
Inventor:
Thomas A. Edison
by Frank L. Dyer
Atty.

T. A. EDISON.
SOUND RECORD.
APPLICATION FILED JAN. 3, 1907.

964,221.

Patented July 12, 1910.

3 SHEETS—SHEET 2.

Witnesses:
Frank D Lewis
Delos Holden

Inventor:
Thomas A. Edison
By Frank L. Dyer
Atty.

T. A. EDISON.
SOUND RECORD.
APPLICATION FILED JAN. 3, 1907.
964,221.
Patented July 12, 1910.
3 SHEETS—SHEET 3.
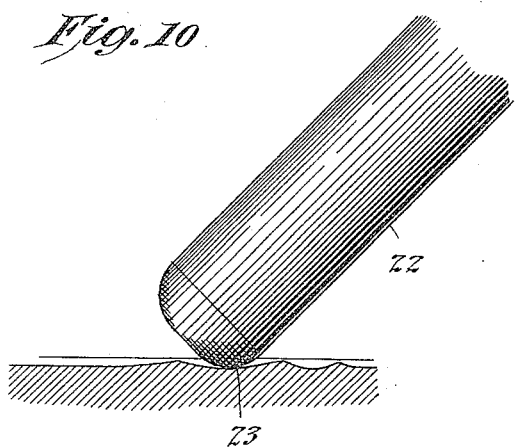
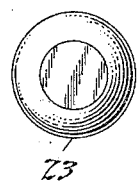
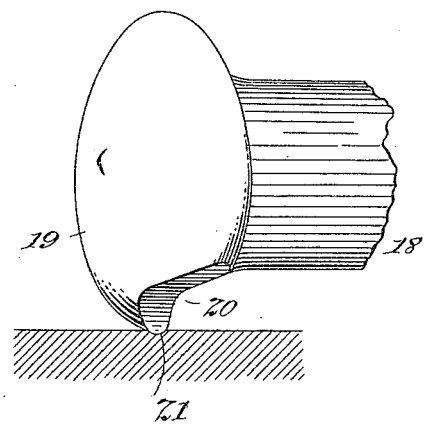
Witnesses:
Frank D. Lewis
Delos Holden
Inventor:
Thomas A. Edison
by Frank L. Dyer
Atty.

UNITED STATES PATENT OFFICE.

THOMAS A. EDISON, OF ORANGE, NEW JERSEY, ASSIGNOR TO NEW JERSEY PATENT COMPANY, OF WEST ORANGE, NEW JERSEY, A CORPORATION OF NEW JERSEY.

SOUND-RECORD.

964,221. Specification of Letters Patent. Patented July 12, 1910.

Application filed January 3, 1907. Serial No. 350,646.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Sound-Records, of which the following is a description.

My invention relates to various improvements in sound records, and my object is to provide a sound record of superior quality and so relatively condensed that a much more extended reproduction may be secured from a cylinder of standard dimensions than is now possible.

As phonograph records are made under existing conditions, a circular edged recorder having a diameter of about .040 inch is engaged with a rotating blank, so as to track very slightly below the surface, the surface speed of the blank being upward of ninety feet per minute and the available recording space being only one-hundredth of an inch in width. The diaphragm being caused to vibrate under the effect of sound waves, the recording stylus will partake of the same movements so as to thereby form the record, which will obviously consist of an enormous number of minute depressions or gouges, connected together, and varying in form and dimensions. Owing to the small available width of space in which the record may be formed, and to the fact that the recording stylus is about four times as wide as that space, the deepest depressions which can be formed without overlapping upon the adjoining spaces, are extremely shallow, being about six ten-thousandths of an inch in depth. The walls of such a record groove in which the relation of width to depth is about sixteen to one, are of such slight curvature that difficulty is experienced in tracking the record, unless the reproducer stylus is mounted with great flexibility. Furthermore, with records of standard length, slightly over four inches, and turning at the usual speed of 160 revolutions per minute, the available time in which to record the desired sounds is less than three minutes, so that many songs or musical selections cannot be entirely recorded. It would be inexpedient to reduce the surface speed of the blank, because experience has shown that for the correct recording and reproduction of music any attempt to materially reduce the relation of length to width of the recorded waves or depressions, depreciates the quality of the reproduced sounds. In my Reissue Patent No. 11,857 of September 25th, 1900, I discussed this point in detail. On the other hand, to make any change in the dimensions of the records themselves, would unfit them for use with hundreds of thousands of talking machines now on the market. Finally, under existing conditions and dealing with a recording stylus four times as wide as the space in which it cuts, the resistance to the entrance of the cutting edge into the material, increases very rapidly for each succeeding increment of depth; or in other words, the energy required to force the cutting edge into the material for the first quarter of the maximum cut is very much less than that required to force the cutting edge into the material for the final quarter of the maximum cut. Consequently, sounds which are relatively weak, are more perfectly recorded than very loud sounds, because with the former the amplitude of vibration of the recording stylus will more nearly coincide with that of the sound waves.

What I propose by my present invention is to produce a sound record having the following characteristics: (1) It is of the standard dimensions of length and diameter, so that it may be used on existing talking machines by making very slight changes therein. (2) The quality of the recorded and reproduced sounds will be superior to that of records made under existing conditions, without, however, in any way affecting the loudness of the reproduction, and (3) the time of reproduction and of recording will be greatly extended, whereby songs and musical compositions now impossible of successful recording, may be satisfactorily recorded and reproduced. To secure these results, I make my improved record on a recording machine having a feed screw with a much finer pitch than the present standard, and preferably a pitch of two hundred threads per inch, and I make use of a recording stylus, the curve of which presents a circle whose diameter is only about twice that of the available space, instead of four times the same, as under existing conditions. I find, as a result of calculation and experiment, that in order to cut a record to the present maximum depth in a space one-two-hundredth of an inch wide, instead of one-one-hundredth inch, the recording stylus instead of being one-half the diameter as that used in the latter case, as might be supposed, should in fact be only about one-fourth the diameter, or according to my calculations, about .0105 inch. By making use of a pitch of two hundred threads per inch, I obtain twice the length of record groove, so that if the surface speed remains unchanged, I am in this way enabled to double the time of recording and reproducing. The change, however, would make it possible to materially reduce the surface speed, since owing to the narrowness of the record groove, a reduction in speed to half that now used, would result in the same relative shape of the waves or depressions, and hence the latter could be tracked with the same facility as those now made under existing conditions at double the speed, if the reproducer stylus bore the same relation to the size of the record as at present. Since, however, the reproducer stylus would have a diameter of less than ten one-thousandths of an inch as against thirty-five one-thousandths, it would track such a record with greater facility than can the present reproducers track the record groove as now made. Of course, to reduce the diameter of the reproducing stylus to one-fourth that now employed, and to reduce the surface speed one-half, would be to impose very much greater wear on the record surface, and would necessitate the employment of very hard materials. With materials of a wax-like nature adapted to be molded by casting, as I shall presently describe, it will probably be commercially desirable not to materially reduce the speed, but in the case of metallic records, which are perfectly feasible though expensive, a reduction in speed to one-half can be readily made without seriously affecting the quality of the reproduction. At the same time the loudness of the reproduction is not affected, since the amplitude of vibration of the diaphragm is not changed. I therefore prefer to maintain the surface speed substantially what it is at present, not only to prevent undue wear, but to improve the quality of the reproduction, since by making the width of the record groove only one-half its present dimension without increasing the length of the various depressions which characterize the same, and by reducing the diameter of the stylus to one-fourth the size now used, I am enabled to accurately track the extremely fine and delicate portions of the record representation of overtones and the finer shadings of the principal tones. In other words, the effect is substantially the same as if under existing conditions the surface speed were doubled and the diameter of the reproducer ball were reduced one-half, without, however, encountering any foreign sounds that might be produced by such a high speed.

By employing a recording stylus, whose diameter is only about twice the available space in which to record, instead of four times the space as is now the case, the record groove will be formed with much more clearly defined side walls, and consequently, the reproducer stylus will track such a groove with greater ease and certainty than the very shallow grooves that are formed under existing conditions. Furthermore, a recording stylus as I propose herein, more nearly approaches the theoretically perfect device in which the resistance to the cutting effect is the same for each successive unit of depth. Although with the new recording stylus the rate of energy required to force the cutting edge into the material increases perceptibly with the depth of cut, it is far less than the rate of increase of energy necessary to force the present size of stylus into the recording material to the same depth. By reason of this fact, with my improved arrangement, the record groove will be more nearly a graphic representation of the sound waves, and there will be less aberration in the reproduction, particularly on loud notes, than is now the case. Furthermore, by reason of the small diameter of such a recorder, it cuts more readily into the material and hence imposes a smaller resistance to the vibration of the diaphragm than a larger stylus, such as those now used. Consequently, the diaphragm may be made lighter and more responsive to the sounds.

In order that the invention may be better understood, attention is directed to the accompanying drawings, forming part of this specification, and in which—

Figure 7:
Figure 6:

Figure 1, is a diagrammatic view, one hundred times enlarged, showing a recording stylus, as at present used, and illustrating the relative depth and width of its maximum cut; Fig. 2, a similar view, showing the improved recorder on the same scale; Fig. 3, a plan view on the same scale, showing part of a record groove, formed by the recorder of Fig. 1; Fig. 4, a similar view on the same scale, showing the same record formed by the recorder of Fig. 2, at the same surface speed; Fig. 5, a similar view on the same scale, showing the same record formed by the recorder of Fig. 2, at one-half the surface speed; Fig. 6, a diagrammatic sectional view, six hundred times enlarged showing graphically the area of the material removed by the stylus of Fig. 1, in cutting to the full maximum depth and to one-fourth, one-half, and three-fourths thereof respectively; Fig. 7, a similar view on the same scale in connection with the stylus shown in Fig. 2; Fig. 8, a diagram illustrating graphically the area of material removed by the two forms of stylus, in the four positions shown in Figs. 6 and 7; Fig. 9, a perspective view of a suitable recording stylus for making improved sound records, and Figs. 10 and 11, side and end views of a suitable reproducing stylus for engaging the same.

Similar parts are represented by the same reference numerals.

Referring first to Fig. 1, I show the recording stylus 1, of a diameter of .04 inch and tracking to the maximum depth in the recording material 2. The depth of this cut is extremely slight, being in fact, only about six ten-thousandths of an inch. Such a record groove is also very shallow, its maximum width being about sixteen times its maximum depth, so that its side walls are hardly defined at all, and, in consequence, very slight side stresses will throw the reproducer out of the groove, to produce "skipping".

In Fig. 3, I show a plan view of a part of a sound record, which would be formed by the recorder described. Many of the depressions or waves are of greater length than width and hence can be tracked by a spherical stylus, or more perfectly by a button shaped stylus as described in my reissue patent, but certain of the depressions, which are frequently encountered in practice, and which probably are reperesentations of overtones or very weak fundamental tones, are materially shorter than their width and are difficult to reproduce, except with a stylus having an objectionably narrow beaded edge. It will be seen from Fig. 6, showing the same groove, in cross section, many times enlarged, that the recorder in entering the material for the first quarter of its maximum movement is required to remove much less material than in movement during the next quarter, whereby the resistance offered to the stylus will very greatly increase as it cuts into the material. I have made a careful computation of the areas included within the dividing lines of this figure, and have plotted them on Fig. 8. Thus the line 5—6 may be considered as representing the area of cross section of the material removed during the first quarter of the cut, or the resistance to the cutting tool; to the same scale, 7—8 represents the area removed or resistance to cutting during the second quarter, 9—10 during the third quarter and 11—12, the fourth quarter. The rate of increase of resistance to the cutting effect of the style, may be graphically represented by the curved line 4, 5, 7, 9, 11. From this diagram, it will be evident that as the stylus cuts into the material, the resistance encountered increases very rapidly, and becomes very pronounced as the stylus reaches the maximum depth. Consequently, the record will be distorted, the portions thereof representing loud sounds being proportionately more imperfect than the portions representing weaker sounds.

Referring now to Fig. 2, I illustrate the new recording stylus 13, whose cutting edge presents a curve slightly more in diameter than twice the width of the available recording path, which I prefer to make one two-hundredths of an inch or thereabout. I find that in the case of two hundred threads per inch, the diameter of the stylus should be almost exactly .0105 inch to cut to the same depth as the stylus 1 in the case of one hundred threads per inch. Such a record, as shown in Figs. 2 and 7, is provided with very clearly defined side walls, its maximum width being only about eight times its maximum depth, and in consequence the reproducer stylus will be kept in engagement therewith with much greater certainty than in the case of the very shallow record groove of Fig. 1.

In Fig. 4, I illustrate the appearance of the same record shown in Fig. 3, assuming it to have been made with the small recorder of Fig. 2, and at the same surface speed. Here it will be seen that the narrowing of the record groove has altered the shape of the depressions or waves, so that the latter are apparently much extended (see for example, the two depressions 3, 3) and the reproducer stylus can more readily engage and track the same, particularly since the diameter of the stylus is only about one-fourth of that now used. In fact, to produce the same relative formation of the waves or depressions, to give the effect shown in Fig. 5, the surface speed would have to be reduced one-half. With very hard material, that might be done with excellent results, but with wax-like materials although relatively hard, I prefer to maintain the surface speed as at present, in order not to make the wear on the record excessive. At the same time, as already indicated, by maintaining the present surface speed so as to double the relative length to breadth of the individual depressions constituting the record, and by reducing the diameter of the reproducer ball to about one-fourth, conditions are present under which the stylus will very much more perfectly track all portions of the record. In fact, those portions of the record which under existing conditions are not tracked at all, for instance, those representing the overtones of the finer shadings of the fundamental tones, will be perfectly tracked under the conditions presented herein so as to add materially to the quality of the reproduction.

In Fig. 7, I illustrate in cross section, many times enlarged, the record groove made with the stylus of Fig. 2, and in which the same comparison is made as in Fig. 6. Here it will be seen, that the amount of material to be removed is not only much less than with the larger stylus, but the resistance to the cutting effect as the stylus enters the material is more nearly uniform. This is perhaps better shown in Fig. 8, where the area 4, 14, 6, represents the area of material removed by the stylus during the first quarter of its maximum cut; the area 6, 14, 15, 8, the area for the second quarter; the area 8, 15, 16, 10 the area for the third quarter; the area 10, 16, 17, 12, the area for the last quarter. The rate of increase of resistance to the cutting effect of the style may be graphically represented by the curved line 4, 14, 15, 16, 17. A comparison of that line with the line 4, 5, 7, 9, 11, shows very graphically the diminished rate of increase of resistance to the cutting effect, in the case of the stylus of Fig. 2, as compared to Fig. 1, and at the same time a comparison of the total areas of material removed at any given depth of cut by the respective recording styluses, discloses graphically the great difference in the work to be performed thereby, and the relative ease with which the smaller stylus enters the material. Of course, in making these comparisons between the two forms of stylus, I have not gone to the extent of determining the cubical contents of the masses of material removed by them; but the comparison is sufficiently illustrated by referring to cross-sectional areas alone.

From the comparison above made, it will be evident that with a recording stylus, such as shown in Fig. 2, the distortion, due to the resistance of the material to the cutting effect will be considerably less than with the stylus shown in Fig. 1, and there will also be less difference in the distortion of records, representing loud sounds, and those representing weaker sounds, than is now the case, so that records made with the improved stylus will be of superior quality than those which can be made under existing conditions. Furthermore, the stylus shown in Fig. 2, cuts more readily than the stylus shown in Fig. 1; consequently, the diaphragm with which it is used may be made more sensitive and therefore more readily responsive to the sound vibrations.

A form of recording stylus, suitable for cutting the extremely minute record, herein contemplated, is shown in Fig. 9, and is described in detail and claimed in an application filed by me on even date herewith. With this recording stylus the stylus is provided with a shank 18, formed with a button head 19, having a cutaway portion 20, so as to result in the production of a cutting edge 21. The curve of the head 19 is of a proper radius to give the desired maximum cut within the necessary restricted path offered for the reception of the record. In the case of a record that is 200 threads per inch, the diameter of the circle representing the cutting edge should be slightly greater than one one-hundredth of an inch as I have previously explained. It will, of course, be understood, however, that while such a recorder is entirely suited for the purpose, any other form of stylus having a circular or approximately circular cutting edge that is sufficiently small in diameter may be made use of.

In Figs. 10 and 11, I illustrate a suitable form of reproducing stylus for engaging the very fine record, and which may be made of the desired smallness in diameter. This stylus comprises a cylindrical shank 22, the lower end of which is formed with a rounded engaging edge 23 to accurately track the record, the stylus being preferably maintained in engagement with the record at substantially the angle shown. Like the recorder of Fig. 9, the reproducer shown in Figs. 10 and 11, may be replaced by other forms of stylus, suitable for the purpose. In making the improved records, it is, of course, necessary to make use of a recording machine, the pitch of whose feed screw is sufficiently fine for the purpose, say—200 threads per inch. Having obtained a satisfactory master in such a machine, I prefer to make duplicates therefrom by any suitable process, instead of using them for direct reproduction, since, owing to the fineness of the record groove, it is important that relatively hard material should be used, on which the records could not be satisfactorily made in the first instance. A suitable duplicating process by means of which copies may be made from a mold secured from such a master, is disclosed in a patent of J. W. Aylsworth, No. 855,605 granted June 4, 1907, wherein the mold is rotated at a high speed and the molten material is caused to be distributed over the bore thereof by reason of the centrifugal force developed, after which the rotation is continued until the material has set sufficiently to maintain its shape. The material is then allowed to cool until it shrinks from the mold, after which the record is finished on its interior, and ends, if necessary. If the records are to be made of a wax-like material, as becomes readily possible with such a process as that indicated, I select a material which is very hard and tough, so as to resist the wear, which would be obviously greater than if a larger stylus is used, as under present conditions. Suitable materials may, however, be made, which will be sufficiently tough as to permit the improved records to compare favorably as to their wearing qualities with records made under existing conditions. An example of such a composition is disclosed in an application of J. W. Aylsworth, filed November 7, 1906, Serial No. 342,318, said composition comprising a mixture of asphalt, stearate of lead and a resin gum. In using my improved records on existing talking machines, the only changes therein which will be required will be the substitution of a finer reproducing stylus, possibly a more sensitive diaphragm, and mechanical connections by which the stylus will be caused to track the finer thread of the record. This latter may be done by either substituting a finer pitch feed screw on the reproducing machine, or by making use of a differential feed mechanism, or any desired connections between the driving shaft and the feed screw, by which the desired feed of the reproducer arm may be effected from the original 100 thread feed screw of the present standard.

It will be understood that where in the claims I refer to my sound record as one whose record groove is approximately circular in cross section, the latter may be a curve which is either circular or closely approximates the arc of a circle within the limits of the record groove. Thus, the groove is circular if cut by the recorder shown in Fig. 9, or by the recorder shown in Fig. 2 if the shank thereof is maintained parallel to the record surface. If, however, the shank of the recorder stylus is set at an acute angle to the record surface, as for example, an angle of 10 to 20 degrees, as is usual in practice, the cross section of the groove will be an arc of an ellipse of such slight eccentricity, however, as to very closely approximate the arc of a circle. Similarly if the recorder has a cutting edge which only approximates a circle, the groove cut thereby would accordingly vary slightly from the circular in cross section.

Having now described my invention, what I claim as new and desire to secure by Letters Patent is as follows:

1. As a new article of manufacture, a duplicate sound record made of a hard tough material, whose record groove is substantially circular in cross section, of a pitch of approximately 200 threads per inch, and the maximum depth of which groove is greater than $\frac{1}{10}$ of its maximum width, substantially as set forth.

2. As a new article of manufacture, a duplicate sound record made of a hard tough material, whose record groove is substantially circular in cross section, has approximately 200 threads per inch, and is of a maximum depth approximately one-eighth of its maximum width, substantially as and for the purposes set forth.

3. As a new article of manufacture, a sound record having a continuous record groove formed thereon having a pitch of approximately 200 threads per inch, the record groove having in cross section approximately the form of an arc of a circle the diameter of which is approximately twice the maximum width of the groove, substantially as set forth.

4. As a new article of manufacture, a sound record having a continuous record groove formed thereon having a pitch materially finer than 100 threads per inch, the record groove having in cross section approximately the form of an arc of a circle the diameter of which is less than .013 inch, the maximum depth of the groove being greater than $\frac{1}{10}$ its maximum width, and the gouges or waves of maximum width occupying substantially all the available space transversely of the record groove, substantially as set forth.

5. As a new article of manufacture, a sound record having a continuous record groove of the vertically-undulating type formed thereon having a pitch materially finer than 100 threads per inch, the record groove having in cross-section approximately the form of an arc of a circle the diameter of which is between three times and one and one-half times the maximum width of the groove, the maximum depth of the groove being greater than $\frac{1}{10}$ its maximum width, substantially as set forth.

This specification signed and witnessed this 28th day of December 1906.

THOS. A. EDISON.

Witnesses:
FRANK L. DYER,
ANNA R. KLEHM.